US010552347B2

(12) United States Patent
Adachi et al.

(10) Patent No.: US 10,552,347 B2
(45) Date of Patent: Feb. 4, 2020

(54) DATA PROCESSOR

(71) Applicant: Renesas Electronics Corporation, Tokyo (JP)

(72) Inventors: Koji Adachi, Tokyo (JP); Yoichi Yuyama, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 16/058,634

(22) Filed: Aug. 8, 2018

(65) Prior Publication Data
US 2018/0349295 A1    Dec. 6, 2018

Related U.S. Application Data

(63) Continuation of application No. 15/242,492, filed on Aug. 20, 2016, now Pat. No. 10,073,793.

(30) Foreign Application Priority Data

Sep. 28, 2015    (JP) ................................ 2015-189699

(51) Int. Cl.
     *G06F 12/14*      (2006.01)
     *G06F 12/1027*      (2016.01)
     *G06F 9/50*      (2006.01)

(52) U.S. Cl.
     CPC ........ *G06F 12/1483* (2013.01); *G06F 9/5016* (2013.01); *G06F 12/1027* (2013.01);
(Continued)

(58) Field of Classification Search
CPC .. G06F 9/5016; G06F 9/5077; G06F 12/1027; G06F 12/1483; G06F 2212/1052; G06F 2212/152; G06F 2212/68
(Continued)

(56) References Cited

U.S. PATENT DOCUMENTS 7,610,464 B2    10/2009   Otsuka
2005/0027960 A1    2/2005   DeMent et al.
(Continued)

FOREIGN PATENT DOCUMENTS

JP     2009-523269 A    6/2009
JP     2013-140477 A    7/2013

OTHER PUBLICATIONS

Office Action dated Jan. 8, 2019, in Japanese Patent Application No. 2015-189699.

*Primary Examiner* — Gary J Portka
(74) *Attorney, Agent, or Firm* — Shapiro, Gabor and Rosenberger, PLLC

(57) ABSTRACT

A data processor includes an access target with the address assigned to a memory space, an access subject that gains access to the access target while specifying address, identifier, and access type, and a memory protection resource including an associative memory to perform an access control. The memory protection resource includes a plurality of entries, each including a region setting unit, an identifier determination information unit, and an attribute setting unit. When the address specified by the access subject at the access is included in the region set in the region setting unit in the entry, the identifier agrees with at least one of the identifiers specified according to the identifier determination information, and the specified access type agrees with the access type set in the attribute setting unit, the memory protection resource permits the access.

16 Claims, 11 Drawing Sheets

(52) U.S. Cl.
CPC ............... *G06F 2212/1052* (2013.01); *G06F 2212/152* (2013.01); *G06F 2212/68* (2013.01)

(58) Field of Classification Search
USPC ........................... 711/152, 163, 164; 726/29
See application file for complete search history.

(56) References Cited

U.S. PATENT DOCUMENTS

| | | |
|---|---|---|
| 2012/0216002 A1 | 8/2012 | Moyer et al. |
| 2013/0073827 A1* | 3/2013 | Moyer ............... G06F 12/1483 |
| | | 711/168 |
| 2017/0093659 A1* | 3/2017 | Elend .................... H04L 43/08 |
| 2017/0185539 A1 | 6/2017 | Xu et al. |

* cited by examiner

FIG. 11

| Valid | REGION SETTING UNIT | ATTRIBUTE SETTING UNIT | ASID SETTING UNIT |
|---|---|---|---|
| | | | |
| | | | |
| | | | |
| | | | |
| | | | | entry 0
entry 1
entry 2
⋮
entry N-2
entry N-1

| ASIDM | 0xFF | 0x00_0000 |
|---|---|---|
| ASID | 0xXX | 0xAB_CDEF |

FIG. 13

| ASIDM | 0xFF | 0x00_0000 |
|---|---|---|
| ASID | 0xXX | 0xAB_CDEF |
| ASIDI | 0x12 | 0xXX_XXXX |

DATA PROCESSOR

CROSS-REFERENCE TO RELATED APPLICATIONS

The disclosure of Japanese Patent Application No. 2015-189699 filed on Sep. 28, 2015 including the specification, drawings and abstract is incorporated herein by reference in its entirety.

BACKGROUND

The invention relates to a data processor and particularly, it is to be preferably applied to an access protection for the resources assigned to a memory space in a processor.

In a data processor with a processor mounted thereon, various resources such as memory and function module are assigned to the memory space in the processor, and an address is specified in order to gain access to the resources, to read and write data or execute a program. In the case of multitasking, generally, a memory space is divided into a plurality of regions, and in every divided region, which access to permit or prohibit is defined according to each task, hence to protect the memory space.

In US Patent Application Publication No. 2005/0027960, there is disclosed a Translation Look-aside Buffer (TLB) mounted on a processor executing a plurality of software partitions. A plurality of software partitions are regarded as a plurality of operating systems (OS: Operating System) and a plurality of independent modules of one software. Generally, the TLB is included in a memory management unit (MMU: Memory Management Unit), and formed by an associative memory of performing conversion between logical address and physical address. In the above publication, a field for holding a logical partition identifier (LPID: Logical Partition Identification) is added to the entry of the TLB, in addition to the virtual address tag, and only when the LPID specified by an access subject such as a processor at access time agrees with the held LPID, in addition to the agreement of the access virtual address, the access is permitted as a TLB hit. In the execution of the software partitions, the own LPID is added to gain access to the memory space; therefore, each region formed in the memory space is protected from any access with the different LPID from the own assigned LPID.

SUMMARY

After examination of the US Patent Application Publication No. 2005/0027960 by the inventor et al., the following novel problem is found.

In the memory space, there is sometimes provided with a shared region accessed by a plurality of partitions in common. The case where a plurality of software partitions share a part of the memory region in order to exchange data or where a common function module is used in common corresponds to the above. The TLB disclosed in the above publication permits access only when the virtual address tag and the LPID, held in each entry of the associative memory forming the TLB, agree with each other. Therefore, in order to share a part of the memory region among the plural software partitions, a plurality of entries for holding LPIDs of all the shared software partitions is necessary. The entries are to hold the LPIDs different from the same virtual address tag.

The inventor et al. have found that this problem exists not only in the TLB but also in a memory protection unit (MPU: Memory Protection Unit) having the same mechanism. Further, the inventor et al. have found that the same problem exists not only in a multitasking system by the plural OSs or the plural software modules but also in a multiprocessor system with a plurality of processor cores mounted there. In the multiprocessor system, each divided region in the memory space is occasionally referred to as "domain" instead of the above "partition"; while an access to each processor core is permitted to some domains, the same problem is found in the domain shared among the plural processor cores.

Specifically, when a plurality of access subjects with each identifier (ID) attached gain access to a plurality of regions within a memory space, there is a problem that in order to permit the plural access subjects to share a part of the region, in the memory protection resource which performs the memory protection of controlling the access authority based on the ID, entries of the associative memory mounted on the memory protection resources are not effectively used. Here, as the access subject, whether it is software or hardware is indifferent. The OSs and the software modules can be the access subject of the software and the processors in a multiprocessor system can be the access subject of the hardware.

The means for solving the problem will be described below, and other problems and novel features will be apparent from the description and the attached drawings of this specification.

According to one embodiment, the invention is as follows.

Specifically, a data processor including an access target with the address assigned to a memory space, an access subject that gains access to the access target while specifying address, identifier, and access type, and a memory protection resource that permits or prohibits the access, based on the address, identifier, and access type specified accompanied by the access, is formed as follows.

The memory protection resource includes a plurality of entries, each including a region setting unit, an identifier determination information unit, and an attribute setting unit. When the address specified by the access subject at an access is included in the region set in the region setting unit, the identifier agrees with at least one of a plurality of identifiers specified according to the identifier determination information, and the specified access type agrees with the access type set in the attribute setting unit, the memory protection resource permits the access.

The effects obtained by one embodiment will be briefly described as follows.

Specifically, even when a part of the memory space is shared by a plurality of access subjects, one entry can permit the access accompanied by a plurality of IDs in common, hence to improve the use efficiency of the entries.

BRIEF DESCRIPTION OF THE DRAWINGS

FIG. 11 is a view for use in describing a constitutional example of a plurality of entries in the memory protection resource.

FIG. 12 is a view for use in describing an operation example of a mask circuit 14 and an agreement detection circuit 15.

FIG. 13 is a view for use in describing an operation example of an ASIDI substitution circuit.

DETAILED DESCRIPTION

Figure 1:
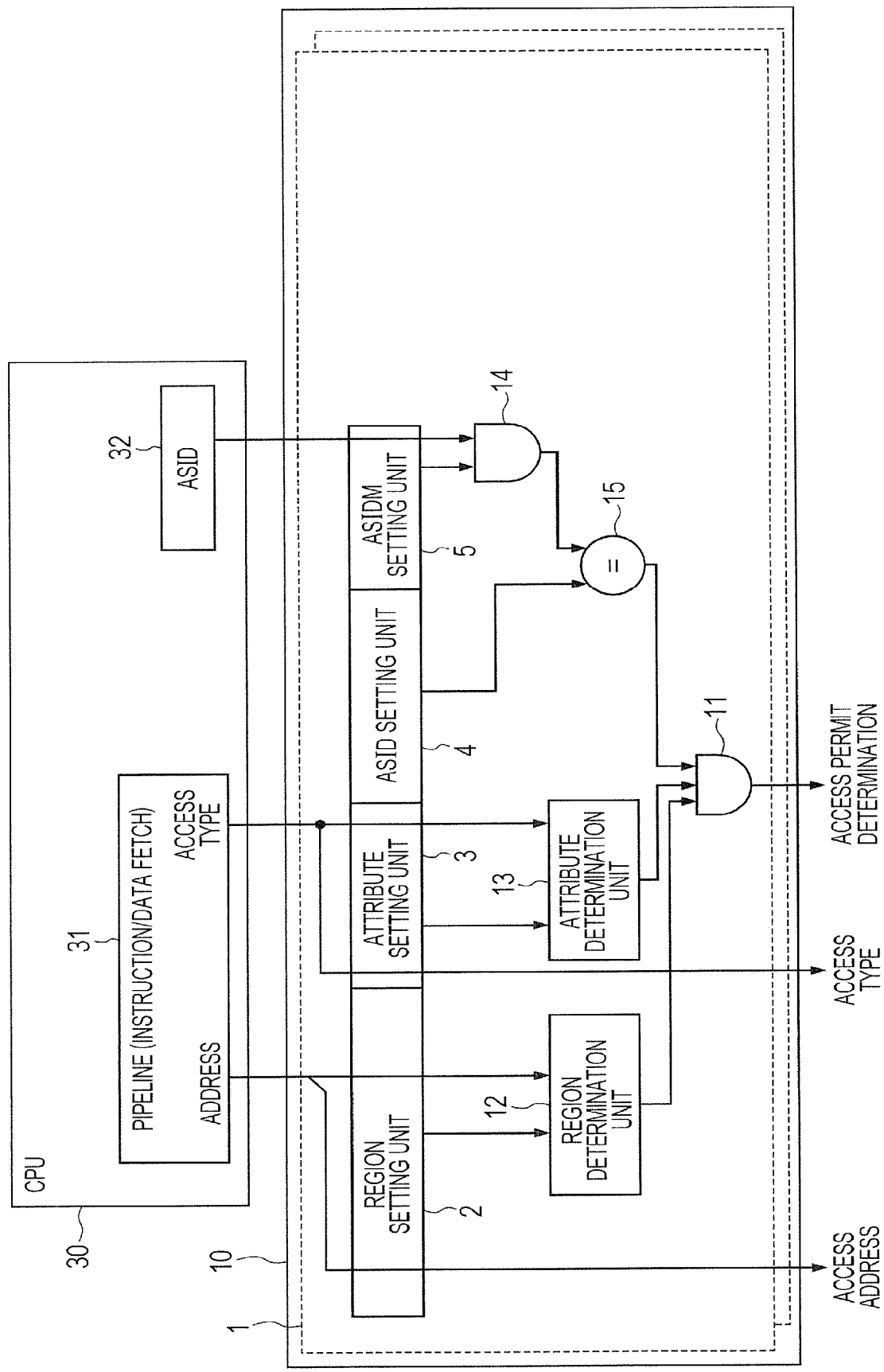
FIG. 1 is a block diagram showing a constitutional example of a memory protection resource according to a first embodiment.

Embodiments will be described in details. In the drawings for use in describing the embodiments, the same reference codes are attached to the same elements having the similar function and the repeated description is omitted.

First Embodiment

A basic constitution of a data processor (100) including a memory protection resource (10) will be described. Here, it is not particularly referred to a specified drawing but some reference codes attached to some function elements are described in brackets just in case for the convenience in referring to the reference codes in the following drawings described later.

The memory protection resource (10) is a function block of permitting or prohibiting access to every region as an access target according to a predetermined access type for every access subject (30), at the access time to various types of resources with each address assigned to the memory space. The typical resource with address assigned to the memory space is a memory (51) and also a peripheral function block (52) provided with address-assigned register group also corresponds to the above resource.

The data processor (100) includes an access target with the address assigned to the memory space, an access subject which gains access to the access target, specifying the address, identifier (ASID), and access type, and the memory protection resource (10) which permits or prohibits the access to the access target from the access subject, based on the specified address, identifier, and access type.

Here, the access subject (30) is, in a narrow sense, a hardware that can be a bus master such as Central Processing Units (CPU) (30, 30_1, 30_2) and Direct Memory Access Controller (DMAC) (30_3), in a processor including a bus (60). In a broad sense, however, the access subject (30) may be OS and middleware operating on CPU, application software or task and software partitions forming the above. In other words, the access subject is the unit of managing the access authority to various resources with each address assigned in the memory space. If an operating system (OS), middleware, and application software are running on one CPU, memory regions for the OS, middleware, and application software permitted to access are mutually different. On the contrary, from a viewpoint of certain memory region, the access authority given to the OS is different from the access authority given to the middleware or the application software. Thus, even if it is the access from the same CPU, the access authorities given to the same access are various and they respectively belong to the access subjects. On the other hand, when one application software is run in a plurality of CPUs in parallel, if the access authority does not have to be controlled separately, the access subjects as the hardware are various but they can be regarded as the same access subject. Generally, the memory region is divided for every access subject and other access subject is prohibited from gaining access (especially, writing) to (into) the memory region occupied by one access subject. However, there is the case of sharing the same memory region among a plurality of access subjects in order to exchange data and information therebetween. In such a case, the shared memory region is allowed to be accessed from the plural access subjects.

The access type may include an instruction execution of software in the memory region, in addition to the read or write from or to the memory region. When the access subject is a processor such as CPU, an instruction fetch may be handled as an instruction execution having a different access type from that of the data reading/writing.

The basic memory protection resource (10) includes a plurality of entries (1) including a region setting unit (2), an identifier determination information unit (4), and an attribute setting unit (3). The entries are plural entries mounted on the associative memory forming the memory protection resource (10). The memory protection resource (10) permits the access when the address input from the access subject (30) requiring an access is included in the region set in the region setting unit (2) of the entry, the identifier (ASID) agrees with at least one of a plurality of identifiers specified by the identifier determination information, and the access type agrees with the access type set in the attribute setting unit (3).

According to this, even when a part of the memory space is shared by the plural access subjects, one entry can permit the access accompanied by the plural identifiers (ASID) in common, hence to improve the efficiency of using the entry. The search value of the identifier input from the access subject is not collated with one identifier for every one entry but is compared with the plural identifiers; therefore, the entries are effectively used.

Figure 8:
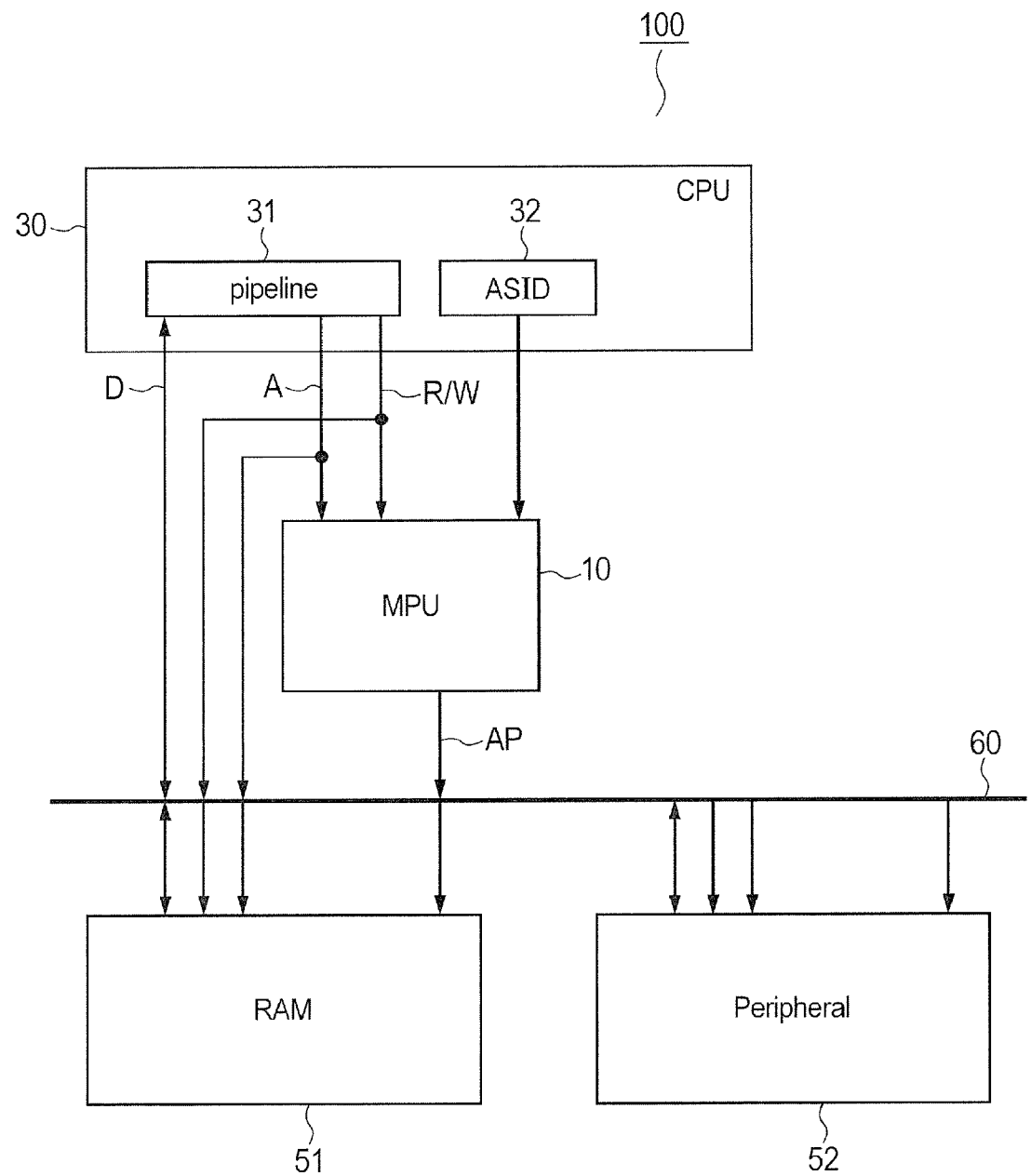
FIG. 8 is a block diagram showing a constitutional example of a data processor with the memory protection resource mounted as MPU.
Figure 9:
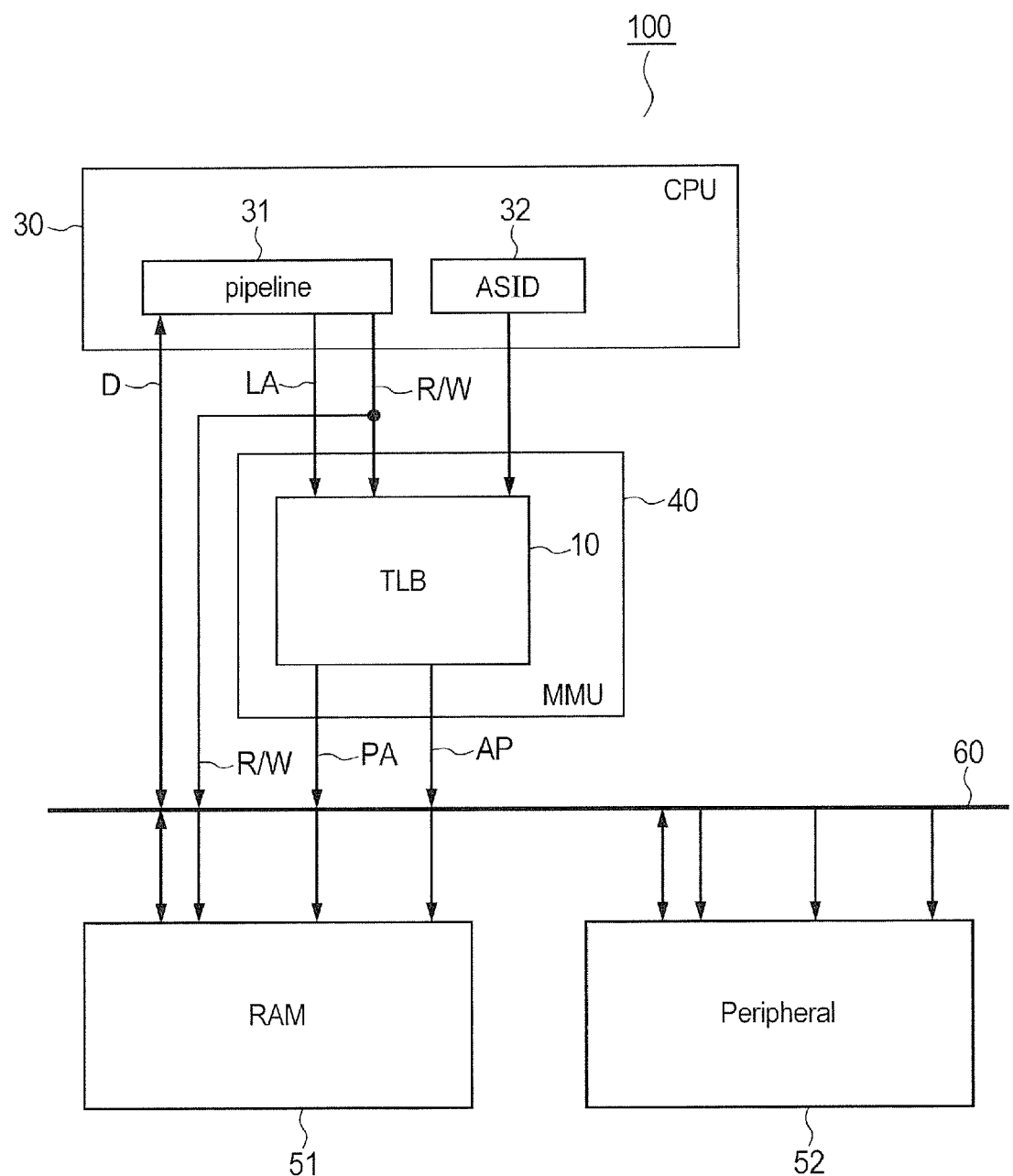
FIG. 9 is a block diagram showing a constitutional example of the data processor with the memory protection resource mounted as TLB of the MMU.
Figure 10:
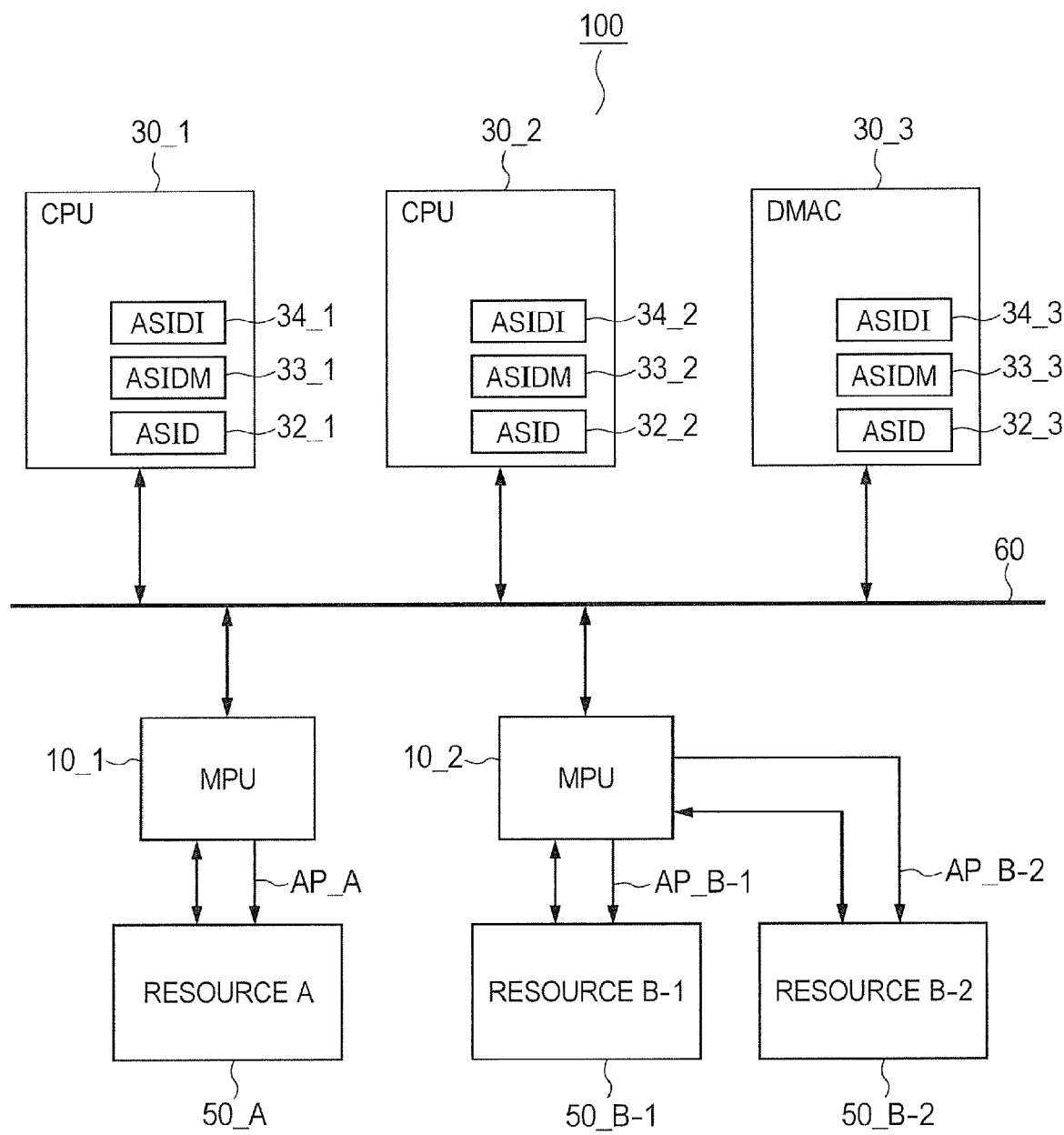
FIG. 10 is a block diagram showing a constitutional example of the data processor with a plurality of memory protection resources mounted in connection to a plurality of objects to be accessed.

FIGS. 8, 9, and 10 are block diagrams each showing a constitutional example of the data processor 100.

FIG. 8 is a constitutional example of the data processor 100 when the memory protection resource is mounted as a memory protection unit (MPU) 10. Each wiring in the drawing may include any number of signal lines, and without distinguishing whether it is one or plural, a so-called vector notation is omitted in the drawing. This is true to the other drawings in this specification. In the data processor 100, a CPU 30, a memory (RAM) 51, and a peripheral function block (Peripheral) 52 are mutually coupled through a bus 60, and the MPU 10 is provided between the CPU 30 and the bus 60. The RAM 51 and the peripheral function block 52 are the access target and the CPU 30 itself, a virtual processor operated by the CPU 30, or software operated by the CPU 30 (correctly, software partition) are the access subject. The CPU 30 includes a pipeline 31 of controlling instructions and data fetch and an identifier (ASID: Address Space IDentification) 32 indicating the access subject. The CPU 30 specifies the address A and the access type R/W at that time from the pipeline 31, together with the ASID 32, and requires access to the access target, to input and output data D. The address A, the access type R/W, and the ASID 32 are input in the MPU 10, whether or not an access authority of gaining access of the type specified by the access type R/W to the memory region requested by the address A is given is determined for every access subject, and access permit determination AP as the determination result is output to the bus 60. Although it is not particularly illustrated, the access type may include instruction execution other than the reading/writing as mentioned above. The bus 60 (substantially, a bus arbitration circuit or a bus control circuit not illustrated) executes an access to the access target with the memory region assigned when the access permit determination AP indicates that the access is permitted, while the bus 60 does not execute an access when the access permit determination AP indicates that the access is prohibited. Although illustration is omitted, when an access is prohibited, a signal such as access error may be returned to the access subject such as the CPU 30.

According to this, a memory protection function can be provided in the access to the access targets including the memory such as the RAM 51 and the function module such as the peripheral function block 52.

FIG. 9 is a constitutional example of the data processor 100 when the memory protection resource is mounted as the TLB 10 within the memory management unit (MMU) 40. The data processor 100 is the same as that of FIG. 8 in that the CPU 30, the RAM 51, and the peripheral function block 52 are mutually coupled together through the bus 60, while it is different in that instead of the MPU, the MMU 40 is provided between the CPU 30 and the bus 60. The RAM 51 and the peripheral function block 52 are the access targets and the CPU 30 itself, the virtual processor operated by the CPU 30, or the software operated by the CPU 30 (correctly, software partition) is the access subject. The CPU 30 includes the pipeline 31 for controlling instructions and data fetch and the identifier (ASID) 32 indicating the access subject. The CPU 30 specifies the logical address LA and the access type R/W at that time from the pipeline 31, together with the ASID 32 and requires access to the access target, to input and output data D. The logical address LA, the access type R/W, and the ASID 32 are input in the TLB 10 of the MPU 40, and whether or not an access authority of gaining access of the type specified by the access type R/W to the memory region requested by the logical address LA is given is determined for every access subject and access permit determination AP as the determination result is output to the bus 60. Here, the TLB 10 converts the logical address LA into the corresponding physical address PA and outputs the above to the bus 60. Although it is not particularly illustrated, the access type may include instruction execution other than the reading/writing as mentioned above. The bus 60 executes an access to the access target having the memory region assigned when the access permit determination AP indicates that the access is permitted, while the bus 60 does not execute the access when the access permit determination AP indicates that the access is prohibited. Although illustration is omitted, when an access is prohibited, a signal such as access error may be returned to the access subject such as the CPU 30.

According to this, the TLB included in the MMU can provide a memory protection function.

FIG. 10 is a constitutional example of the data processor 100 when the plural memory protection resources are mounted in connection to the plural access targets. The above mentioned two examples are the examples of coupling MPU or TLB that is one memory protection resource to the CPU 30 that is the access subject of the hardware; the plural memory protection resources may be coupled to the plural access targets. Further, the access subject of the hardware may be plural.

The data processor 100 includes CPUs 30_1 and 30_2 as the bus masters, DMAC 30_3, first and second MPUs 10_1 and 10_2, resource A (50_A), resource B-1 (50_B-1), and resource B-2 (50_B-2) as the access targets, and the bus 60. The resource A (50_A), the resource B-1 (50_B-1), and the resource B-2 (50_B-2) as the access targets are, for example, memories such as RAM or peripheral function blocks; the resource A (50_A) is coupled to the bus 60 through the first MPU 10_1, and the resource B-1 (50_B-1) and the resource B-2 (50_B-2) are coupled to the bus 60 through the second MPU 10_2.

The CPUs 30_1 and 30_2 respectively include the pipelines 31_1 and 31_2 of controlling the instructions and data fetch although they are not illustrated. The CPUs 30_1 and 30_2 respectively include the identifiers (ASID) 32_1 and 32_2 indicating the respective access subjects, and the DMAC 30_3 includes the ASID 32_3 indicating the access subject when the DMA transfer is executed. The CPUs 30_1 and 30_2 and the DMAC 30_3 may further include the identifier mask information (ASIDM) 33_1, 33_2, and 33_3 and identification initial information (ASIDI) 34_1, 34_2, and 34_3. The ASIDM and the ASIDI will be described later.

Upon receipt of the bus right, the CPUs 30_1 and 30_2 and the DMAC 30_3 specify the address A and the access type R/W at that time, together with the corresponding ASID 32_1, 32_2, and 32_3 and require an access to the access target, hence to input and output the data D. The address A, the access type R/W, and the ASID 32_1, 32_2, or 32_3 are input into the MPUs 10_1 and 10_2 from the bus master (CPU 30_1, 30_2 or DMAC 30_3) obtaining the bus right. The MPUs 10_1 and 10_2 determine whether or not an access authority of gaining access of the type specified by the access type R/W to the memory region requested by the address A is given, for every access subject, when the input address A is within the range of the memory regions assigned to the resources managed by themselves. When the access target is the resource A (50_A), the MPU 10_1 outputs the access permit determination AP_A as the determination result to the resource A (50_A). When the access target is the resource B-1 or B-2 (50_B-1 or 50_B-2), the MPU 10_2 outputs the access permit determination AP_B-1 and AP_B-2 as the determination results to the resources B-1 and B-2 (50_B-1 and 50_B-2) respectively. When the access permit determination AP indicates that the access is permitted, the resource A (50_A), the resource B-1 or B-2 (50_B-1 or 50_B-2) as the access targets execute the access to the access target having the memory region assigned, while when the access permit determination AP indicates that the access is prohibited, they do not execute the access. Although the illustration is omitted, when the access is prohibited, a signal such as address error may be returned to the CPU 30_1 and/or 30_2.

As having been described in the above, the memory protection resource 10 according to the first embodiment may be mounted as the memory protection unit (MPU) 10 or the TLB 10 within the memory management unit (MMU) 40. Further, the data processor 100 with the memory protection resource 10 mounted there may be formed by only one CPU 30 as illustrated in FIGS. 8 and 9 or several CPUs 30_1 and 30_2 as illustrated in FIG. 10. Further, the MPU may be arranged at the side of the bus master not at the side of the bus 60 as illustrated in FIG. 8 or may be arranged at the side of the access target as illustrated in FIG. 10. The memory protection resource in this data processor 100 is not restricted to the constitutional example described below but also it can be applied similarly to the constitutional examples in the second to seventh embodiments described later and various modifications. Further, the data processor 100 is formed on a single semiconductor substrate such as silicon, for example, using the well-known manufacturing technology of Complementary Metal-Oxide-Semiconductor field effect transistor (CMOS) Large Scale Integrated circuit (LSI), although not restricted to this.

The constitutional example of the memory protection resource 10 will be described. The memory protection resource may be mounted as the memory protection unit (MPU) 10 or as the TLB 10 within the memory management unit (MMU) 40 as mentioned above. Here, a method of mounting the memory protection function will be intensively described.

FIG. 1 is a block diagram showing the constitutional example of the memory protection resource 10 according to the first embodiment. The memory protection resource 10 is provided with a plurality of entries 1 including a region setting unit 2, an attribute setting unit 3, and an ASID setting unit 4 and an ASIDM setting unit 5 as the identifier determination information unit.

FIG. 11 is a view for use in describing the constitutional example of a plurality of entries in the memory protection resource 10. The plural entries are entries in the associative memory, including a valid bit (Valid) 9, other than the region setting unit 2, the attribute setting unit 3, and the ASID setting unit 4 as the identifier determination information unit. FIG. 11 shows an example of providing N entries from entry 0 to entry N-1. Each entry may be further provided with the ASIDM setting unit 5. The number N of the entries is arbitrary.

Returned to the description of FIG. 1, the memory protection resource 10 further includes an area determination unit 12, an attribute determination unit 13, a mask circuit 14, an agreement detection circuit 15, and an access permit determination unit 11. The CPU 30 including the pipeline 31 of controlling instructions or data fetch and the ASID 32 indicating the access subject is coupled to the memory protection resource 10, where the address, the access type, and the ASID are input. The region determination unit 12 determines whether or not the address input from the CPU 30 requesting an access is included in the region set in the region setting unit 2 of the entry 1. The attribute determination unit 13 determines whether or not the access type input from the CPU 30 requesting the access agrees with the access type set in the attribute setting unit 3 of the entry. When an excluded part from the comparison object according to the information held in the ASIDM setting unit 5 agrees with the value set in the ASID setting unit 4, the ASID input from the CPU 30 requesting the access is determined to agree with at least one of the plural identifiers (ASID) specified according to the identifier determination information. More specifically, the ASID input from the CPU 30 at the access is formed by a plurality of bits; a part of them is masked with the value set in the ASIDM setting unit 5 by the mask circuit 14 and a part of the remaining is compared with the value set in the ASID setting unit 4 by the agreement detection circuit 15. The comparison results in the region determination unit 12, the attribute determination unit 13, and the agreement detection circuit 15 are input to the access permit determination unit 11; when all the comparison results show "agreement", the access permit determination of permitting this access is output. FIG. 1 shows a logic circuit of positive logic in which when the respective comparison results show "agreement", it becomes high and the access permit determination unit 11 is a 3-input AND gate; however, it may be changed to a logic circuit of negative logic.

The operation example of the mask circuit 14 and the agreement detection circuit 15 will be specifically described. FIG. 12 is a view for use in describing the operation example of the mask circuit 14 and the agreement detection circuit 15. Assume that the ASID setting unit 4 and the ASIDM setting unit 5 are both formed by 32-bit structure and set at 0x00AB_CDEF and 0xFF00_0000 respectively. Here, "0x" indicates the hexadecimal notation and the value of 32-bit is set in eight hexadecimal digits. The mask circuit 14 inverts each bit of 0xFF00_0000 set in the ASIDM setting unit 5 and gets AND with each bit of the input ASID0xXXXX_XXXX. The upper 8 bits of the input ASID is compulsorily changed to 0x00 and the remaining lower 24 bits are input to the agreement detection circuit 15 as they are. The agreement detection circuit 15 determines the agreement or disagreement between the 0x00XX_XXXX input from the mask circuit 14 and the 0x00AB_CDEF set in the ASID setting unit 4. When the input ASID agrees with one of the 256 ASID values of 0x00AB_CDEF, 0x01AB_CDEF, 0x02AB_CDEF, . . . 0xFFAB_CDEF, the agreement detection circuit 15 determines as "agreement". In other words, when the identifier (ASID) input from the access subject agrees with at lease one of the plural identifiers (the above 256 ASID values) specified according to the identifier determination information set in the ASID setting unit 4 and the ASIDM setting unit 5, the address is included in the region set in the region setting unit 2, and the access type agrees with the access type set in the attribute setting unit 3, this access is permitted.

According to this, the memory protection resource in a simple structure can share one entry among a plurality of identifiers.

The operation example shown in FIG. 12 is only one example on assumption of the above constitutional example of the mask circuit 14 and the agreement detection circuit 15, and the constitution of the mask circuit 14 and the agreement detection circuit 15 can be changed variously. For example, the positive logic circuit may be changed to a negative logic and the set value of the masking in the ASIDM setting unit 5 may be changed from "high" to "low". The number of bits such as ASID is not restricted to the illustrated 32 bits.

Second Embodiment

Figure 2:
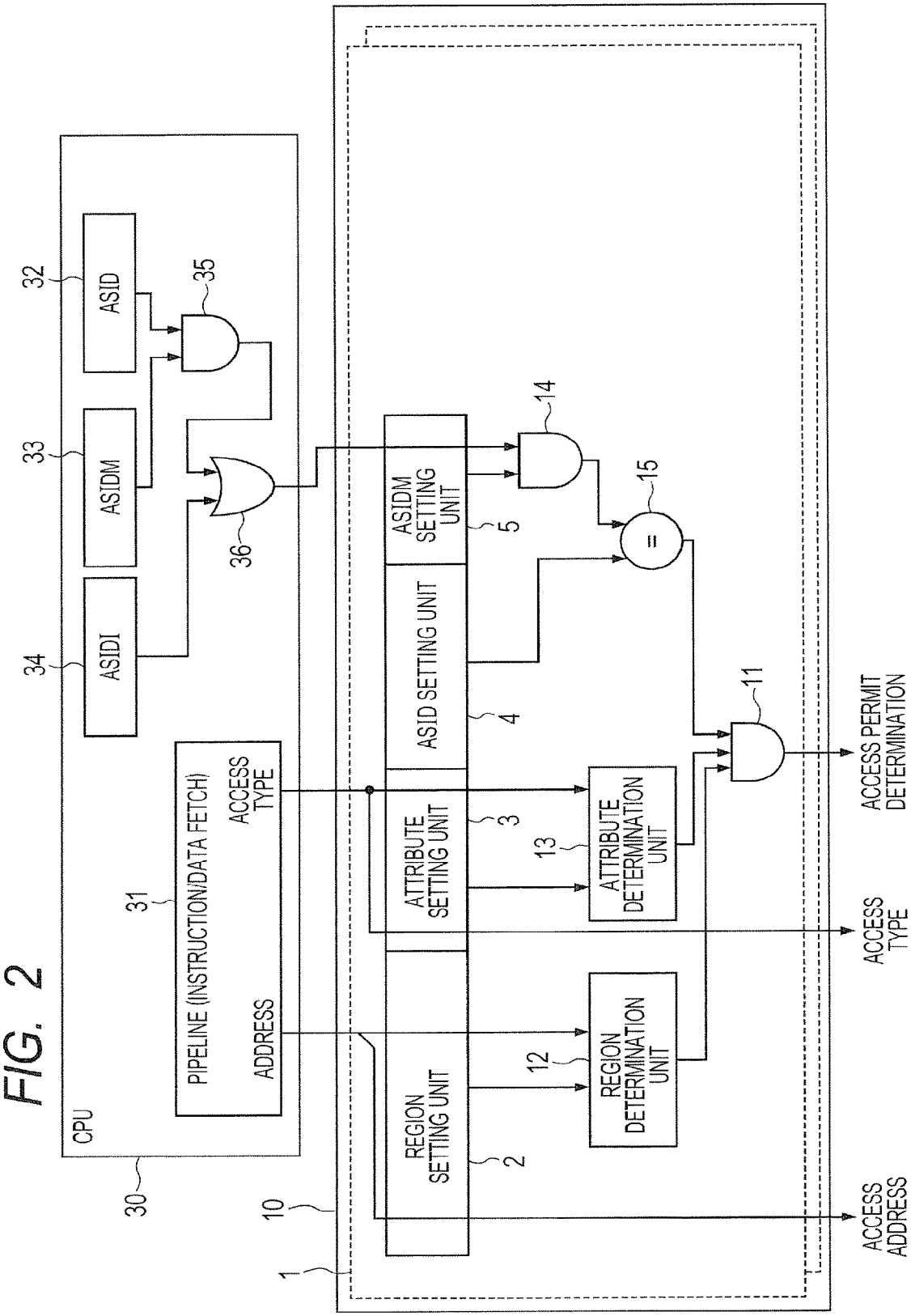
FIG. 2 is a block diagram showing a constitutional example of a memory protection resource according to a second embodiment.

FIG. 2 is a block diagram showing a constitutional example of a memory protection resource 10 according to a second embodiment. Similarly to the CPU 30 shown in FIG. 1, the CPU 30 includes the pipeline 31 and the ASID 32 and further includes ASIDM 33 as the mask information, ASIDI 34 as the identification initialization information, and an ASIDI substitution circuit. The ASIDI substitution circuit is formed by, for example, an AND circuit 35 and an OR circuit 36. The constitution of the memory protection resource 10 is the same as the memory protection resource 10 shown in FIG. 1. The CPU 30 as the access subject holds the mask information corresponding to the information held in the mask (ASIDM) setting unit 5 of the memory protection resource 10 in the ASIDM 33. The ASIDM 33 masks a part of the ASID 32, the masked portion is substituted with the ASIDI 34 to create a new identifier, and instead of the ASID 32, the new identifier is output to the memory protection resource 10 as the ASID research value.

According to this, the range of the values of the identifier (ASID) output from the CPU 30 as the access subject can be restricted.

The operation example of the ASIDI substitution circuit will be described more specifically. FIG. 13 is a view for use in describing the operation example of the ASIDI substitution circuit. In the CPU 30, assume that the ASID 32, the ASIDM 33, and the ASIDI 34 are formed of 32 bits and set at 0x00AB_CDEF, 0xFF00_0000, and 0x12XX_XXXX. In the ASID 32, 0x00AB_CDEF is set in the above example; however, there may be written any ASID depending on the software as the access subject executed by the CPU 30. In the ASIDM 33, 0xFF00_0000 with the upper 8 bits masked is written, in the ASIDI 34, 0x12XX_XXXX with the masked upper 8 bits substituted is written, and therefore, 0x12AB_CDEF is output from the CPU 30 as the ASID research value.

Since the constitutional example and operation of the memory protection resource 10 with the ASID research value input is the same as that in the first embodiment described with reference to FIG. 1, the description is omitted.

The ASID 32, the ASIDM 33, and the ASIDI 34 are mounted, by way of example, as the register in the CPU 30. The authority of operating the registers for storing the ASIDM 33 and the ASIDI 34 is preferentially set upper than the authority of operating the register for storing the ASID 32, hence to prevent from tampering. In a preferred example, the CPU 30 has the operation mode upper than the operation mode of certain domain, for example, a hypervisor mode, and the operation is permitted only in this mode. Further, in the other embodiments, the ASIDM 33 and the ASIDI 34 can be set, for example, through a terminal or they may be hard-wired at a fixed value given at the design time.

The operation example shown in FIG. 13 is only one example on assumption of the above constitutional example of the ASIDI substitution circuit formed by the AND circuit 35 and the OR circuit 36 and the constitution of the ASIDI substitution circuit can be changed variously. For example, it may be changed from the positive logic circuit to the negative logic circuit and the set value of the masking in the ASIDM 33 may be changed from "high" to "low". Further, the number of the bits in the ASID is not restricted to the above mentioned 32 bits.

Third Embodiment

Figure 3:
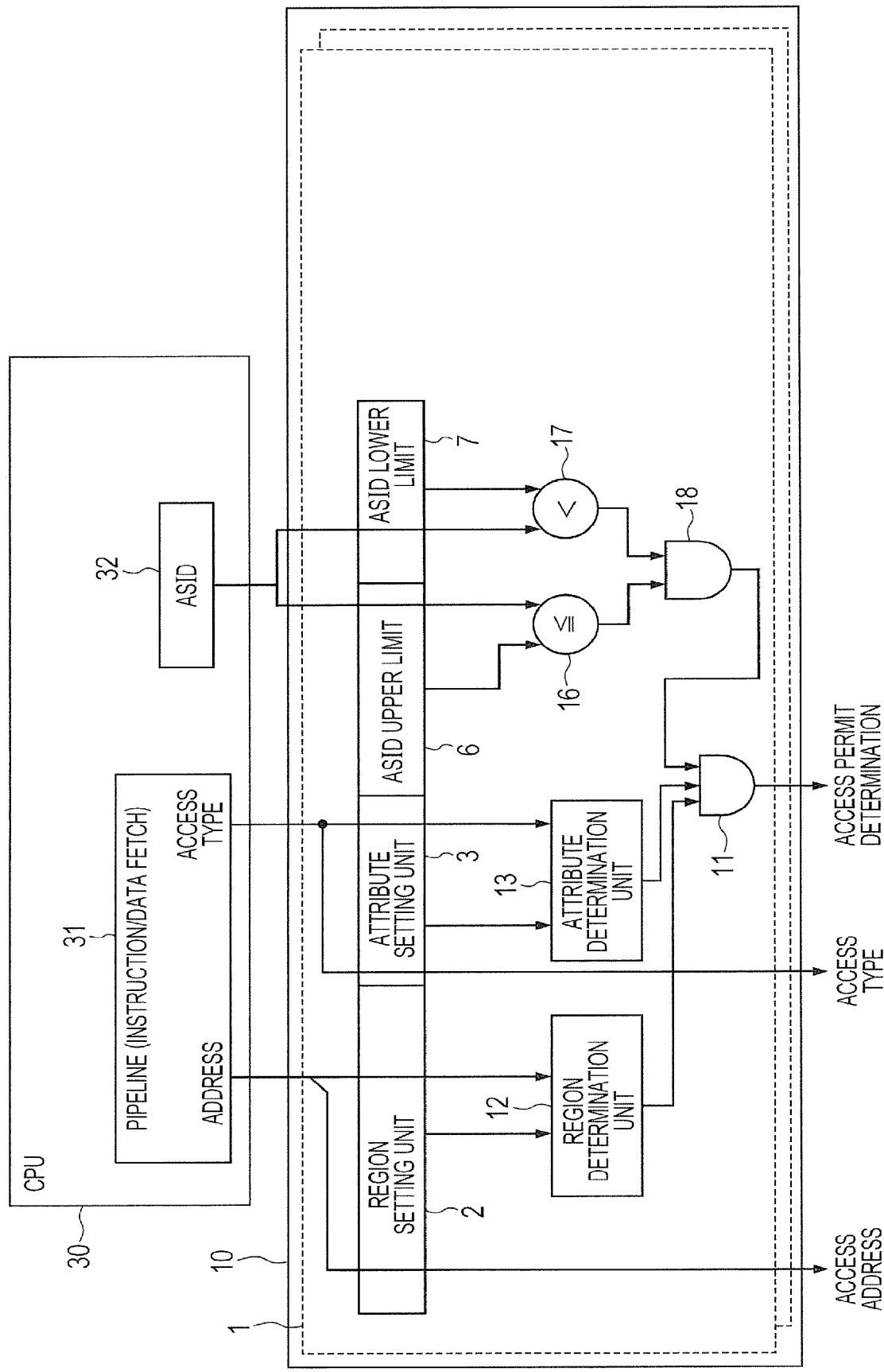
FIG. 3 is a block diagram showing a constitutional example of a memory protection resource according to a third embodiment.

FIG. 3 is a block diagram showing a constitutional example of a memory protection resource 10 according to a third embodiment. In the first embodiment having been described referring to FIG. 1, there is shown the example of including the ASID setting unit 4 and the ASIDM setting unit 5 as the identifier determination information unit in the entry 1. On the other hand, in the third embodiment, the entry 1 includes an ASID upper limit setting unit 6 and an ASID lower limit setting unit 7 as the identifier determination information unit, instead of the ASID setting unit 4 and the ASIDM setting unit 5. Similarly to the first embodiment, the memory protection resource 10 includes the region determination unit 12 and the attribute determination unit 13. Differently from the first embodiment, the memory protection resource 10 of the third embodiment includes two comparators 16 and 17 that compare the ASID input from the CPU 30 respectively to the ASID upper limit setting unit 6 and the ASID lower limit setting unit 7, and an ASID range determining unit 18 that determines whether or not the input ASID as the result is included in the range defined by the ASID upper limit setting unit 6 and the ASID lower limit setting unit 7. The memory protection resource 10 in the third embodiment permits the access when an address input from the CPU 30 as the access subject requiring an access is included in the region set in the region setting unit 2, the input access type agrees with the access type set in the attribute setting unit 3 and the input ASID is included in the range defined by the ASID upper limit setting unit 6 and the ASID lower limit setting unit 7.

According to this, the range of the plural identifiers sharing one entry can be flexibly set. In the first or second embodiment, the plural ASIDs in which each masked bit portion is arbitrary share one entry. Therefore, the plural ASIDs that can share one entry are restricted to the values arranged periodically at the intervals of the power of 2. On the contrary, in the third embodiment, the upper limit and the lower limit can be freely set, the values are not restricted to the intervals of the power of 2 but they can be set flexibly in a possible range. According to this, the degree of freedom in ASID assignment on the whole system is improved.

The authority of operating the values of the ASID upper limit setting unit 6 and the ASID lower limit setting unit 7 is preferentially set upper than the authority of operating the values of the ASID 32, hence to avoid from tampering. In a preferred example, only the operation mode upper than the operation mode of certain domain, for example, a hypervisor mode allows the operation.

Fourth Embodiment

Figure 4:
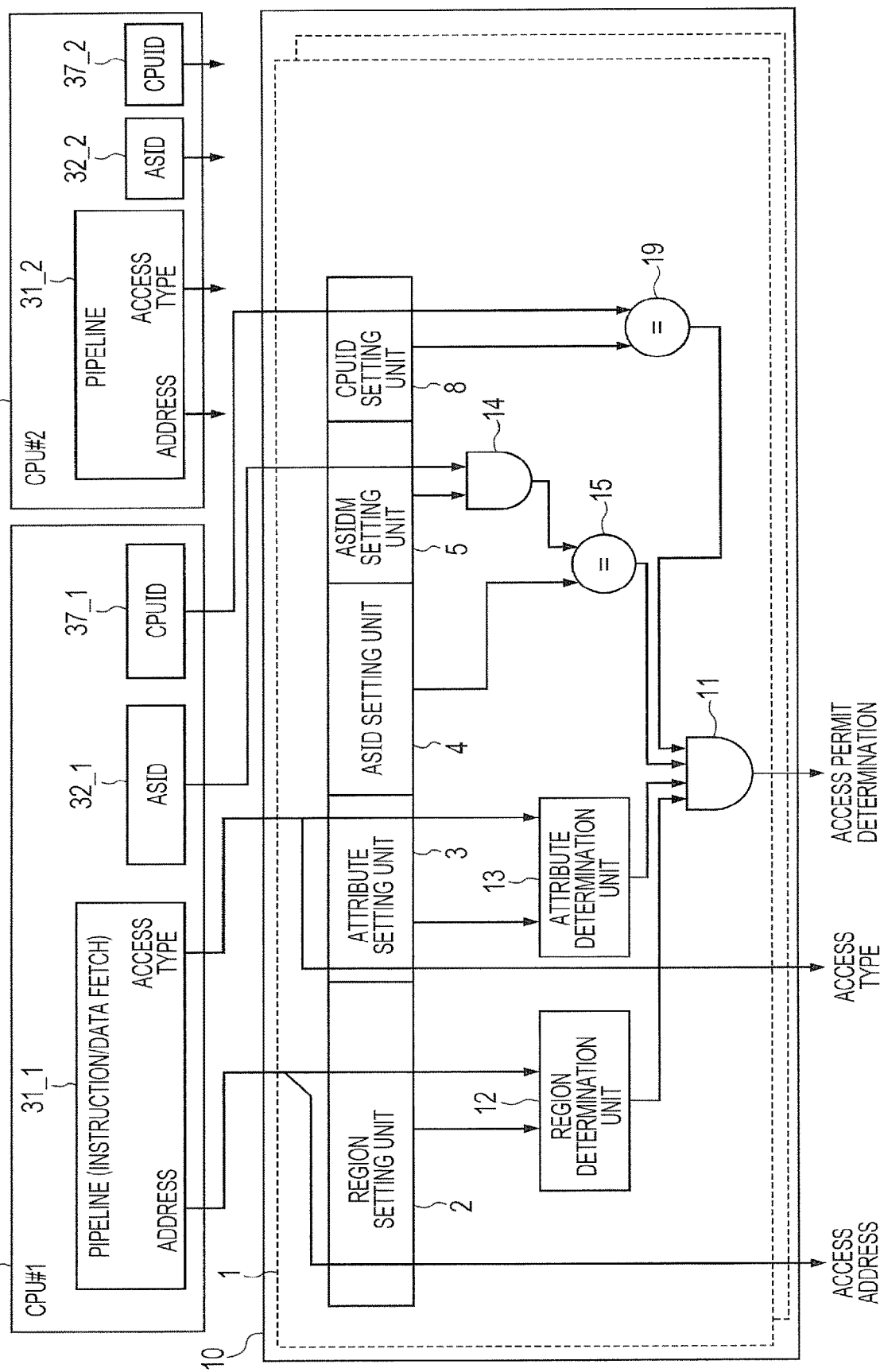
FIG. 4 is a block diagram showing a constitutional example of a memory protection resource according to a fourth embodiment.

FIG. 4 is a block diagram showing a memory protection resource 10 according to a fourth embodiment. The memory protection resource 10 of the fourth embodiment is shared among a plurality of CPUs 30_1 and 30_2. The CPUs 30_1 and 30_2 respectively include the pipelines 31_1 and 31_2 and the ASIDs 32_1 and 32_2, and further CPUIDs 37_1 and 37_2. The CPUIDs 37_1 and 37_2 are processor identifiers inherent in the CPUs 30_1 and 30_2. The CPUIDs 37_1 and 37_2 are mounted, by way of example, as the registers and can be set through terminals or hard-wired to each fixed value. The CPUs 30_1 and 30_2 respectively output the CPUIDs to the memory protection resource 10, in addition to each address, access type, and ASID.

The memory protection resource 10 includes the region setting unit 2, the attribute setting unit 3, the ASID setting unit 4, and the ASIDM setting unit 5 similarly to the first embodiment (FIG. 1), and further includes a CPUID setting unit 8 in the entry 1 in the fourth embodiment. The memory protection resource 10 includes the region determination unit 12, the attribute determination unit 13, the mask circuit 14, the agreement detection circuit 15, and the access permit determination unit 11, similarly to the first embodiment, and further includes a CPUID determining unit 19 in the fourth embodiment. The functions of the region determination unit 12, the attribute determination unit 13, the mask circuit 14, and the agreement detection circuit 15 are the same as those in the first embodiment. In the fourth embodiment, the CPUID determining unit 19 determines whether or not the input CPUID agrees with the value set in the CPUID setting unit 8 and the determination result is input to the access permit determination unit 11 as the additional condition. The access permit determination unit 11 permits the access on the additional condition that the input CPUID agrees with the value set in the CPUID setting unit 8.

According to this, even in a multi-core system, the memory protection resource in a simple structure can share one entry among a plurality of identifiers.

Fifth Embodiment

Figure 5:
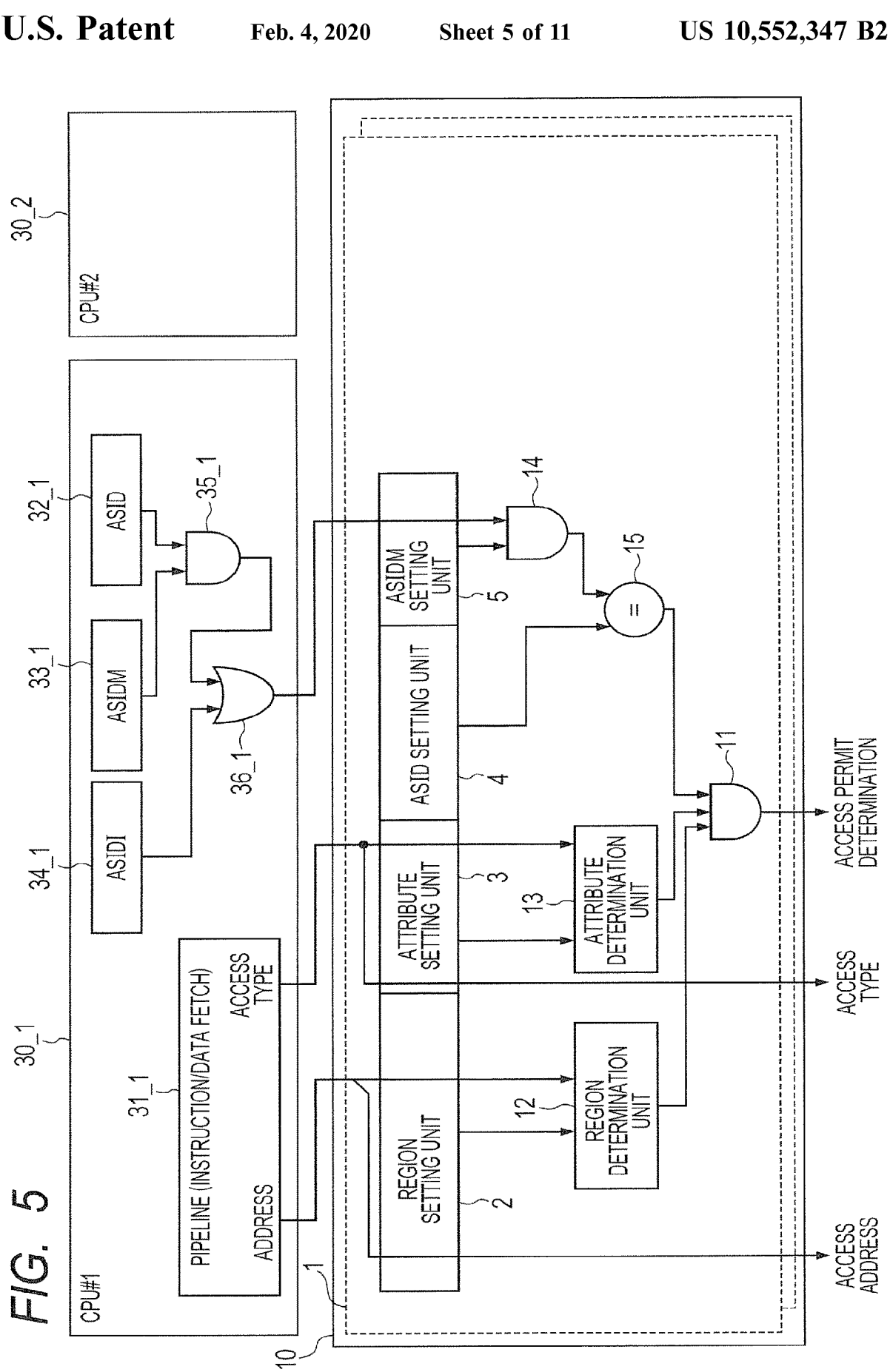
FIG. 5 is a block diagram showing a constitutional example of a memory protection resource according to a fifth embodiment.

FIG. 5 is a block diagram showing a constitutional example of a memory protection resource 10 according to a fifth embodiment. The memory protection resource 10 is shared by a plurality of CPUs 30_1 and 30_2. Each of the CPUs 30_1 and 30_2 is the same as the CPU 30 in the second embodiment shown in FIG. 2. Specifically, the CPU 30_1 includes the pipeline 31_1, the ASID 32_1, the ASIDM 33_1 as the mask information, the ASIDI 34_1 as the identification initialization information, and the ASIDI substitution circuits 35_1 and 36_1. Similarly, the CPU 30_2 includes the pipeline 31_2, the ASID 32_2, the ASIDM 33_2, the ASIDI 34_2, and the ASIDI substitution circuits 35_2 and 36_2. The memory protection resource 10 is the same as the memory protection resource 10 in the second embodiment shown in FIG. 2.

The respective CPUs 30_1 and 30_2 in the fifth embodiment 5 are correlated with the respective inherent identification initialization information (ASIDI) 34_1 and 3_2.

When one of the CPUs 30_1 and 30_2 becomes the access subject, instead of the ASID at that time, a part of the ASID is masked according to the mask information, the masked portion is substituted for the identification initialization information (ASIDI) corresponding to the processor as this access subject, to create a new ASID (ASID research value), and the new ASID is output to the memory protection resource 10.

Since the constitutional example and operation of the memory protection resource 10 with the ASID research value input is the same as in the first embodiment having been described referring to FIG. 1, the description is omitted.

According to this, in a multi-core system, the range of the values of the identifier output from the access subject can be restricted to the inherent value in every processor.

As illustrated in FIG. 10, in the data processor 100 with a plurality of bus masters including the CPUs 30_1 and 30_2, with the ASID output from the software arbitrary, the ASID research value obtained by rewriting the ASID depending on the hardware actually executing the software is output to the memory protection resources 10_1 and 10_2. For example, when one software is divided and executed by the CPU 30_1 or CPU 30_2, the accessible memory region by one CPU 30_1 has to be separated from the accessible memory region by the other CPU 30_2. In this case, even when one ASID is given to the one software, the ASID research value has to be rewritten depending on which CPU to execute the software. As shown in the fifth embodiment, the ASIDI 34_1 and 34_2 has the respective inherent values in the CPUs 30_1 and 30_2, and the ASID research value is rewritten to a proper value and output. According to this, the software does not have to be conscious of the hardware actually operated and also when some ASID is output, the ASID research value restricted to the range of proper values is input to the memory protection resource 10.

Sixth Embodiment

Figure 6:
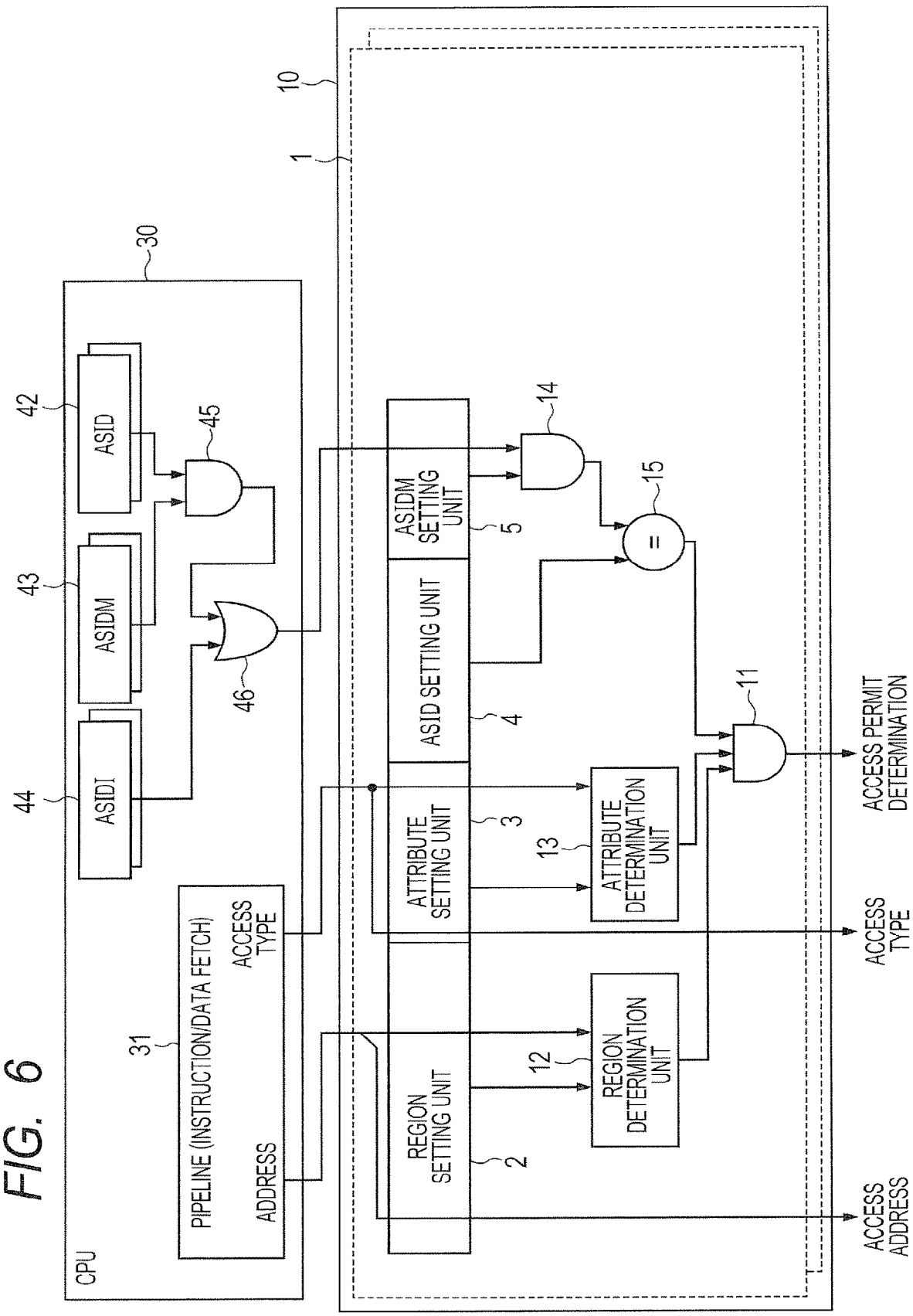
FIG. 6 is a block diagram showing a constitutional example of a memory protection resource according to a sixth embodiment.

FIG. 6 is a block diagram showing a constitutional example of a memory protection resource 10 according to a sixth embodiment. In the CPU 30 in the sixth embodiment, a plurality of virtual processors operate. The CPU 30 includes one pipeline 31 similarly to the CPU 30 in the second embodiment shown in FIG. 2, and further includes a plurality of ASIDs 42, a plurality of ASIDM 43 as the mask information, a plurality of ASIDI 44 as the identification initialization information, and the ASIDI substitution circuits 45 and 46, differently from the CPU 30 in the second embodiment. The plural ASIDs 42, ASIDM 43 as the mask information, and ASIDI 44 as the identification initialization information respectively correspond to the plural virtual processors.

In the ASIDI 44, the respective inherent identification initialization information is correlated to the respective virtual processors. At an access issued from the CPU 30, when the CPU 30 as the access subject is one of the virtual processors, the ASIDI substitution circuits 45 and 46 substitute the ASIDI 44 corresponding to the virtual processor as the access subject for a part specified by the ASIDM 43, of all the bits of the ASID 42 at that point and output the above to the memory protection resource 10.

Since the constitution and operation of the memory protection resource 10 is the same as that of the memory protection resource 10 according to the first and the second embodiments shown in FIGS. 1 and 2, the description is omitted.

According to this, in a virtual multi-core system, the range of the values of the identifier output from the access subject can be restricted to the inherent values in every virtual processor.

Seventh Embodiment

Figure 7:
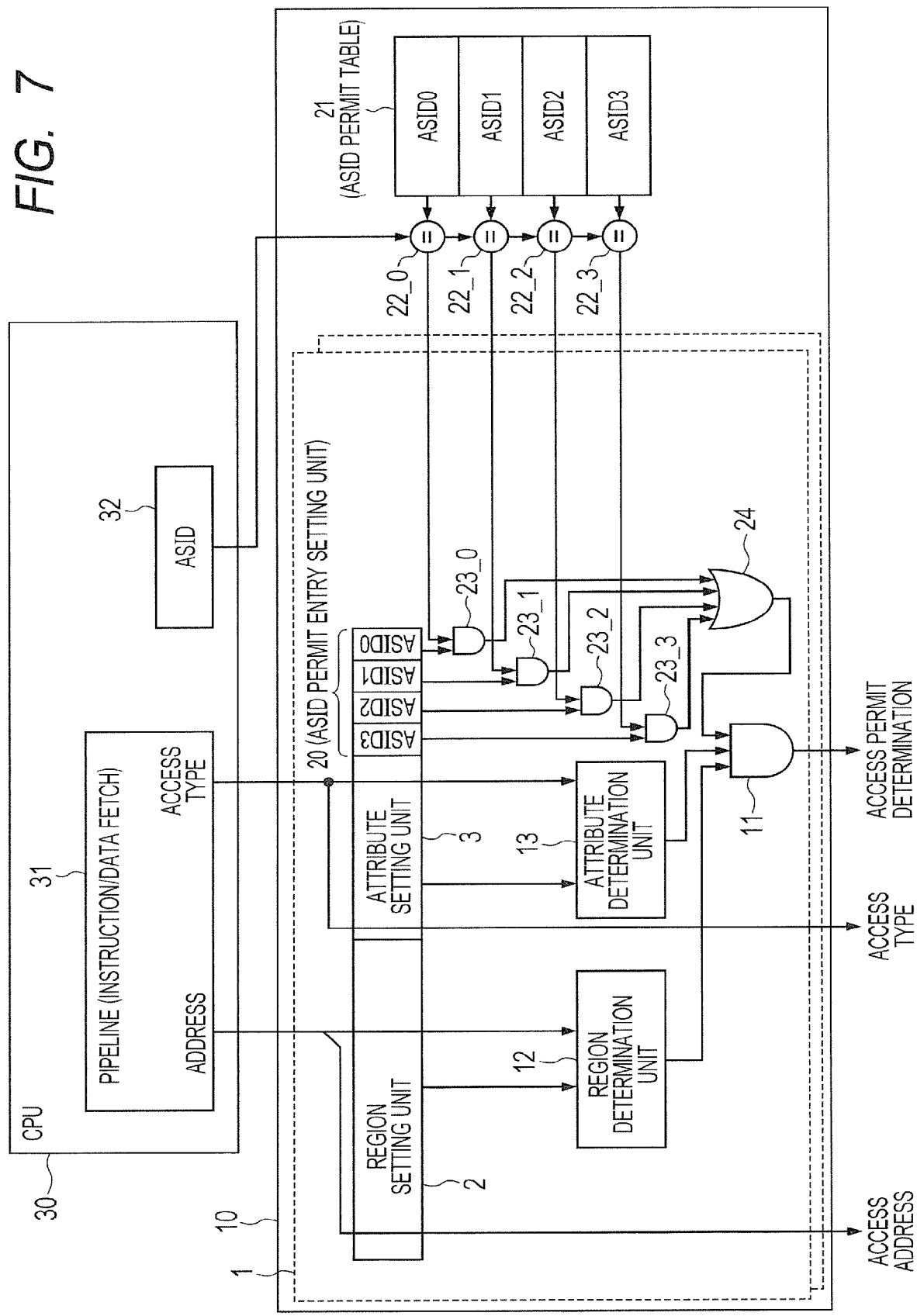
FIG. 7 is a block diagram showing a constitutional example of a memory protection resource according to a seventh embodiment.

FIG. 7 is a block diagram showing a constitutional example of a memory protection resource 10 according to a seventh embodiment. The CPU 30 includes the pipeline 31 and the ASID 32, similarly to the CPU 30 in the first embodiment shown in FIG. 1. The memory protection resource 10 is provided with a plurality of entries 1, including the region setting unit 2 and the attribute setting unit 3, similarly to the memory protection resource 10 in the first embodiment, and further including an ASID permit entry setting unit 20, instead of the ASID setting unit 4 and the ASIDM setting unit 5. Similarly to the memory protection resource 10 in the first embodiment, the memory protection resource 10 includes the region determination unit 12, the attribute determination unit 13, the agreement detection circuit 15, and the access permit determination unit, and further includes an ASID permit table 21, agreement detection circuits 22_0 to 22_3, and logic circuits 23_0 to 23_3 and 24.

At an access time, the memory protection resource 10 receives the address, access type and ASID from the CPU 30. The region determination unit 12 determines whether the address input from the CPU 30 is included in the region set in the region setting unit 2 in the entry 1. The attribute determination unit 13 determines whether the access type input from the CPU 30 at the access agrees with the access type set in the attribute setting unit 3 in the entry 1.

The ASID permit table 21 holds a plurality of possibly accessible ASID values: ASID0 to ASID3. The agreement detection circuits 22_0 to 22_3 compare the ASID 32 input from the CPU 30 to the memory protection resource 10 with the ASID values: ASID0 to ASID3 stored in the ASID permit table 21 and determine whether or not it agrees. The input ASID 32 and the ASID values: ASID0 to ASID3 stored in the ASID permit table 21 are respectively identifier information of several bits (for example, 32 bits), and each of the comparison results by the agreement detection circuits 22_0 to 22_3 is one bit. In other words, the comparison results for the number corresponding to the number of the ASID values: ASID0 to ASID3 stored in the ASID permit table 21 or the comparison results for 4 bits in FIG. 7 are output. The ASID permit entry setting unit 20 stores the information for specifying which comparison result to be reflected in the access permit determination, of the comparisons between the ASID 32 input from the CPU 30 and the ASID values: ASID0 to ASID3. For example, as illustrated, the specification information of 4 bits in total including each 1 bit corresponding to each of the four ASID values: ASID0 to ASID3 is stored there. The AND gates 23_0 to 23_3 perform the AND operation respectively on the comparison results of 4 bits, and only the comparison result of the ASID value corresponding to the bit with the "high" specification information stored in the ASID permit entry setting unit 20 is input to the access permit determination unit 11 formed by the AND gate, as the additional condition by the OR gate 24.

The memory protection resource 10 permits an access when the ASID 32 input from the CPU 30 agrees with at least one of the ASID values: ASID0 to ASID3 set in the ASID permit table 21, the address is included in the region set in the region setting unit 2, and the access type agrees with the access type set in the attribute setting unit 3.

According to this, the range of the plural identifiers (ASID) sharing one entry can be flexibly set. A plurality of ASIDs sharing one entry have such a restriction that they have to be set for every number of the power of 2 in the method using the mask information ASIDM such as the first embodiment; in the third embodiment, the ASIDs are restricted to the range from the upper limit to the lower limit being set; while, in this embodiment, although the number of candidate identifiers is restricted by the hardware, the values of the set ASIDs are completely arbitrary, including the mutual intervals.

Compared with the case of holding all the plural accessible identifiers in the entry, an increase in the circuit size can be suppressed. The method of setting the plural ASIDs sharing one entry in all the entries is the simplest, and in this case, there is a problem of increasing the circuit size extremely. In the seventh embodiment, one ASID permit table 21 is provided and only the specification information of each 1 bit about whether or not to reflect each comparison result to the access permit determination is held in the ASID permit entry setting unit 20 in every entry, hence to suppress an increase in the circuit size.

Although FIG. 7 is the constitutional example of the positive logic circuit, it may be freely changed to the negative logic or another logic circuit of doing the same operation.

As mentioned above, although the invention made by the inventor et al. has been described concretely based on the embodiments, the invention is not restricted to these but it is needless to say that various modifications are possible in the range without departing from the spirit.

What is claimed is:

1. A processing circuit, comprising:
a first access subject having a first access identifier identifying the first access subject;
a second access subject having a second access identifier identifying the second access subject; and
a memory protection circuit configured to receive the first and second access identifiers and determine access of the first access subject and the second access subject to a shared memory, the memory protection circuit including:
a plurality of entries, each entry including an access identifier setting circuit storing access identifier information, and an access identifier setting mask circuit storing access identifier mask information; and
a mask circuit configured to exclude a portion of the first access identifier and a portion of the second access identifier using the access identifier mask information,
wherein the excluded portion of the first access identifier has a different value than the excluded portion of the second access identifier, and the unexcluded portion of the first access identifier has same value as the unexcluded portion of the second access identifier,
wherein the memory protection circuit determines access to the shared memory based on whether said same value is included in the stored access identifier information.

2. The processing circuit of claim 1, wherein the memory protection circuit determines access to the shared memory based on a result of a comparison between said same value and values of the stored access identifiers.

3. The processing circuit of claim 2, wherein the memory protection circuit allows access to the shared memory when said same value agrees with a value of one of the stored access identifiers.

4. The processing circuit of claim 3, wherein the memory protection circuit includes an agreement determination circuit configured to compare said same value with values of the stored access identifiers.

5. The processing circuit of claim 1, wherein each of the first and second access identifiers includes [m:n] bytes, respectively, and wherein the excluded portions of the first and second access identifiers are the respective top m bytes, and the unexcluded portions of the first and second access identifiers are the respective bottom n bytes.

6. The processing circuit of claim 1, wherein the memory protection circuit is further configured to receive a first memory address input and a first access type input from the first access subject and a second memory address input and a second access type input from the second access subject.

7. The processing circuit of claim 6, wherein the memory protection circuit determines access of the first and second access subjects to the shared memory based further on the received respective first and second memory addresses and first and second access types.

8. The processing circuit of claim 7, wherein each of the entries further includes a region setting circuit storing memory address information, and an attribute setting circuit storing access type information.

9. The processing circuit of claim 8, wherein the memory protection circuit determines access to the shared memory based on whether the first and second memory addresses are included in the stored memory addresses and whether the first and second access types are included in the stored access types.

10. The processing circuit of claim 9, wherein the memory protection circuit allows access to the shared memory when said same value agrees with a value of one of the stored access identifiers, the first and second memory addresses are included in the stored memory addresses, and the first and second access types are included in the stored access types.

11. The processing circuit of claim 10, wherein the memory protection circuit further includes an agreement determination circuit configured to compare said same value with values of the stored access identifiers.

12. The processing circuit of claim 11, wherein the memory protection circuit further includes a region determination circuit configured to compare the first and second memory addresses with the stored memory addresses.

13. The processing circuit of claim 12, wherein the memory protection circuit further includes an attribute determination circuit configured to compare the first and second access types with the stored access types.

14. The processing circuit of claim 13, wherein the memory protection circuit further includes an access permit determination circuit configured to receive results from the agreement determination circuit, the region determination circuit, and the attribute determination circuit, and allow access to the shared memory based on the received results.

15. The processing circuit of claim 1, wherein the first and second access subjects are CPUs.

16. The processing circuit of claim 1, wherein the first and second access subjects are software operating on CPUs.

* * * * *